(12) United States Patent
Cai

(10) Patent No.: US 7,429,293 B2
(45) Date of Patent: Sep. 30, 2008

(54) HIGH GLOSS HIGH GAMUT PIGMENT INKJET INK

(76) Inventor: Xiaorong Cai, 381 Elaine Dr., Apt. #221, Lexington, KY (US) 40504

( * ) Notice: Subject to any disclaimer, the term of this patent is extended or adjusted under 35 U.S.C. 154(b) by 302 days.

(21) Appl. No.: 11/331,740

(22) Filed: Jan. 13, 2006

(65) Prior Publication Data

US 2007/0163468 A1    Jul. 19, 2007

(51) Int. Cl.
*C09D 11/02* (2006.01)
(52) U.S. Cl. .................................................. 106/31.89
(58) Field of Classification Search ............... 106/31.89
See application file for complete search history.

(56) References Cited

U.S. PATENT DOCUMENTS

| 5,650,543 | A | 7/1997 | Medina |
| 5,746,818 | A | 5/1998 | Yatake |
| 6,030,441 | A | 2/2000 | Kubota et al. |
| 6,395,079 | B1 * | 5/2002 | Sano ..................... 106/31.59 |
| 2002/0029723 | A1 | 3/2002 | Fox et al. |
| 2002/0149656 | A1 | 10/2002 | Nohr et al. |
| 2005/0070629 | A1 | 3/2005 | Roberts |
| 2005/0239919 | A1 | 10/2005 | Ono |

* cited by examiner

*Primary Examiner*—Jerry Lorengo
*Assistant Examiner*—Veronica Faison Gee

(57) ABSTRACT

Inkjet ink having pigment colorant and two surfactants having low dynamic surface tension as follows: 0.1% to 0.8% by weight of the ink of 2,5,8,11-tetraethyl-6-dodecyn-5,8-diol ethoxylate (sold commercially as DYNOL™ 604) and 0.5 to 1.0% by weight of the ink of ethoxylated 2,4,7,9-tetramethyl-5-decyn-4,7-diol (sold commercially as SURFYNOL® 465). The inks are significantly improved in photo gloss and color gamut for the printed image on swellable and porous glossy photo media.

2 Claims, No Drawings

HIGH GLOSS HIGH GAMUT PIGMENT INKJET INK

TECHNICAL FIELD

This invention relates to improved inkjet inks with pigment colorants having improved gloss and color gamut while other advantages of pigments are maintained.

BACKGROUND OF THE INVENTION

Pigment ink provides excellent light fastness and water fastness. Therefore, pigment ink is becoming more prevalent in inkjet technology for document and photo printing applications. Unlike dye-based inkjet inks, pigment inks contain particles. When the ink is printed on to the substrate, the resulting roughness of the ink surface tends to be much higher than the surface printed by dye-based inks. This high surface roughness leads to lower gloss.

It is difficult to achieve the same gloss value with pigment ink as with dye-based ink. There are many ways to improve the photo gloss of pigment inks. Reducing particle size is one way to achieve the higher photo gloss, but it has limitations. Some surface energy reducing agents could provide better wetting and fast diffusion. The surface roughness of the pigment is related to the formation of the pigment as filter cake, and the roughness characteristics influence the functions of the ink wetting and diffusion of ink ingredients into media.

The addition of certain surfactants and penetrants to pigment ink formulations is known to alter the wetting and diffusion, which reduces the surface roughness and achieves higher gloss of the printing image. Such materials lower the dynamic surface tension of the pigment ink.

DISCLOSURE OF THE INVENTION

This invention defines a mixture of surfactants which provide exceptional and unexpected results. The ink of this invention has two surfactants having low dynamic surface tension as follows: 0.1% to 0.8% by weight of the ink of 2,5,8,11-tetraethyl-6-dodecyn-5,8-diol ethoxylate (sold commercially as DYNOL™ 604) and 0.5 to 1.0% by weight of the ink of ethoxylated 2,4,7,9-tetramethyl-5-decyn-4,7-diol (sold commercially as SURFYNOL® 465). Both of these surfactants lower the static and dynamic surface tension of aqueous inks.

Pigment ink formulations containing these surfactants are significantly improved in photo gloss and color gamut for the printed image on swellable and porous glossy photo media. The 2,5,8,11-tetraethyl-6-dodecyn-5,8-diol ethoxylate reduces both static and dynamic surface tension of the ink to the range of 28 to 36 dyne/cm. That provides excellent wetting and fast diffusion, and efficiently reduces the surface roughness. Therefore, the use of surfactant 2,5,8,11-tetraethyl-6-dodecyn-5,8-diol ethoxylate, with another surfactant which lowers dynamic surface tension can increase the pigment ink photo gloss and the color gamut.

A preferred combination is the ink formulation contains about 0.5% of 2,5,8,11-tetraethyl-6-dodecyn-5,8-diol ethoxylate and about 0.7% of ethoxylated 2,4,7,9-tetramethyl-5-decyn-4,7-diol, which provides excellent jetting properties, high photo gloss and color gamut.

DESCRIPTION OF THE PREFERRED EMBODIMENTS

The ink formulations of this invention typically contain the basic ingredients of pigment inks for inkjet applications. Those ingredients are pigment dispersion, humectant, surfactant and penetrant, or only surfactant, biocide, and water. The surfactants of this invention also function as penetrants. The typical ink formulations are shown in the following examples. The humectants in the following examples are polyethylene glycol, triethylene glycol, and glycerol. Percentage amounts are by weight of the ink. The pigments employed in the examples are C.I. Pigment Blue 15:4, C.I. Pigment Red 122, and C.I. Pigment Yellow 155.

Example 1 (Comparative):
Pigment ink formulation:

| | |
|---|---|
| Pigment dispersion: (Cyan, magenta, or yellow) | 5.0% pigment |
| Humectants: | 20% |
| Biocide: | 0.1% |
| SURFYNOL surfactant/penetrant | 0.7% |
| Balance: D.I. Water | |

Example 2:
Pigment ink formulation:

| | |
|---|---|
| Pigment dispersion: (Cyan, magenta, or yellow) | 5.0% pigment |
| Humectants: | 20% |
| Biocide: | 0.1% |
| SURFYNOL surfactant/penetrant | 0.7% |
| DYNOL surfactant/penetrant | 0.5% |
| Balance: D.I. Water | |

The following table is test data showing that the addition of the surfactant, 2,5,8,11-tetraethyl-6-dodecyn-5,8-diol ethoxylate, to Example 1 pigment ink formulations significantly improved the surface roughness of printed area on porous media. (Porous media is a porous mineral sheet or outer layer of a sheet. The actual sheets used are not commercially available, but available porous media would be comparable for these purposes). The following table establishes an exceptional improvement in photo gloss and color gamut.

| Ink Formulation | Surface roughness - Ra (μm) | 20 degree gloss | Color Gamut |
|---|---|---|---|
| Cyan Formulation 1 | 0.196 | 33.3 | 503 |
| Magenta Formulation 1 | 0.245 | 26.1 | |
| Yellow formulation 1 | 0.258 | 35.7 | |
| Cyan Formulation 2 | 0.156 | 68.2 | 538 |
| Magenta Formulation 2 | 0.169 | 68.5 | |
| Yellow formulation 2 | 0.204 | 62.6 | |

The addition of surfactant, 2,5,8,11-tetraethyl-6-dodecyn-5,8-diol ethoxylate should be controlled at the level of less than 0.8% by weight of the ink if it is used combined with ethoxylated 2,4,7,9-tetramethyl-5-decyn-4,7-diol to keep the ink stable. (When used alone this ethoxylate is generally effective and provides the best performance in amount of 0.8% to 1.5% by weight of the ink.)

In summary 2,5,8,11-tetraethyl-6-dodecyn-5,8-diol ethoxylate (DYNOL™ 604) as the only surfactant/penetrant in pigment ink formulation reduces roughness of the printed surface of photo paper and results in significant improvement in photo gloss and color gamut, but it can also be combined with other surfactants for better performance.

To achieve best performance, 0.1% to 0.8% of 2,5,8,11-tetraethyl-6-dodecyn-5,8-diol ethoxylate is used incorporating with 0.5% to 1% of (SURFYNOL® 465) in the pigment ink formulation. For example, the ink formulation contained 0.5% of 2,5,8,11-tetraethyl-6-dodecyn-5,8-diol ethoxylate and 0.7% of ethoxylated 2,4,7,9-tetramethyl-5-decyn-4,7-diol surfactant provides excellent jetting properties, high photo gloss and color gamut.

What is claimed is:

1. An inkjet ink comprising a pigment dispersion as a colorant, water, and a humectant characterized by said ink comprising 0.1% to 0.8% by weight of the ink of 2,5,8,11-tetraethyl-6-dodecyn-5,8-diol ethoxylate and 0.5 to 1.0% by weight of the ink of ethoxylated 2,4,7,9-tetramethyl-5-decyn-4,7-diol.

2. The inkjet ink as in claim 1 in which about 0.5% by weight of the ink of 2,5,8,11-tetraethyl-6-dodecyn-5,8-diol ethoxylate and about 0.7% by weight of the ink of ethoxylated 2,4,7,9-tetramethyl-5-decyn-4,7-diol.

* * * * *